Jan. 30, 1968   B. L. MEREDITH ET AL   3,366,256
MOTORCYCLE RACK
Filed July 13, 1966   3 Sheets-Sheet 1
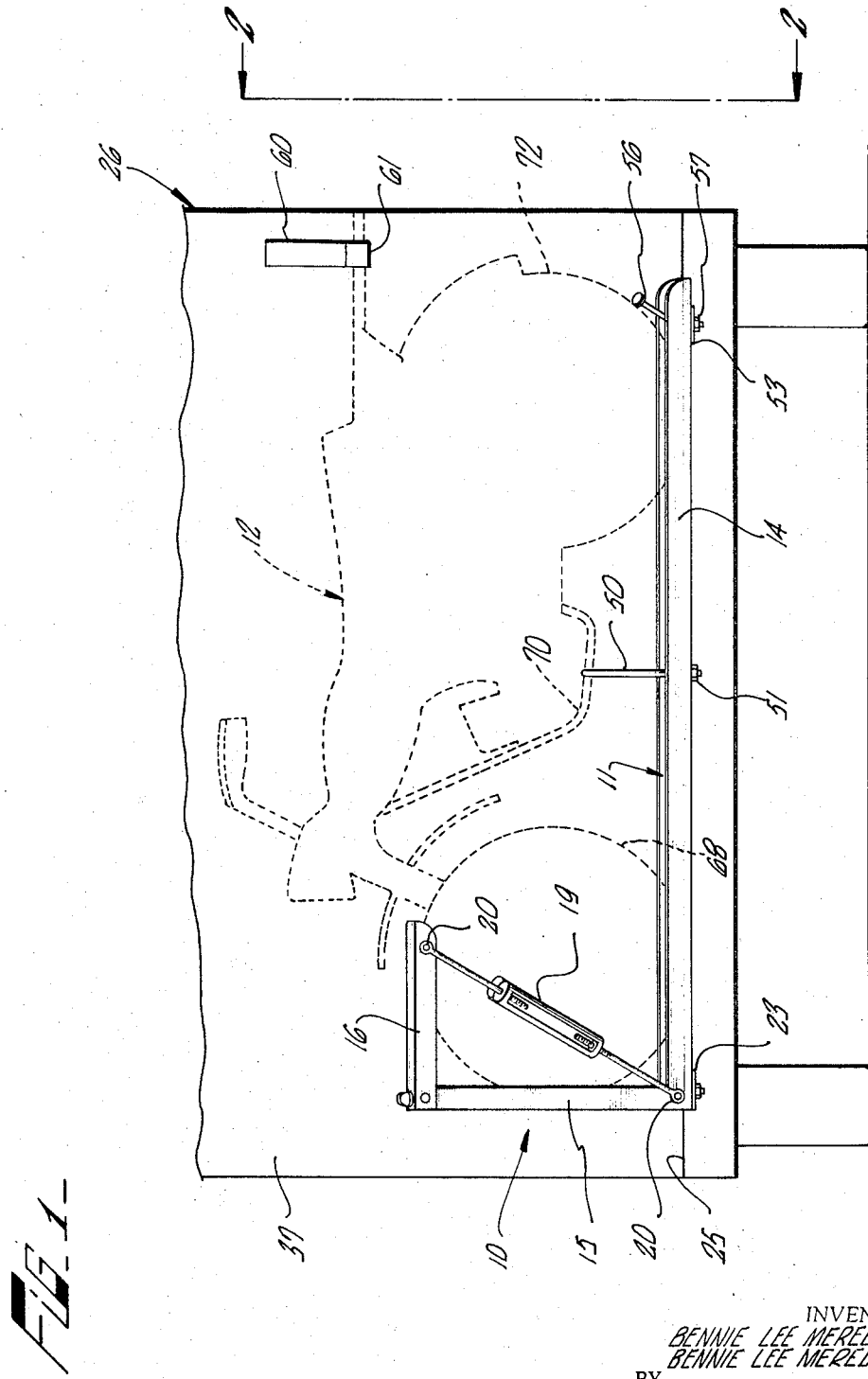
INVENTORS.
BENNIE LEE MEREDITH
BENNIE LEE MEREDITH, JR.
BY
Christie, Parker & Hale
ATTORNEYS Jan. 30, 1968   B. L. MEREDITH ET AL   3,366,256
MOTORCYCLE RACK
Filed July 13, 1966   3 Sheets-Sheet 2
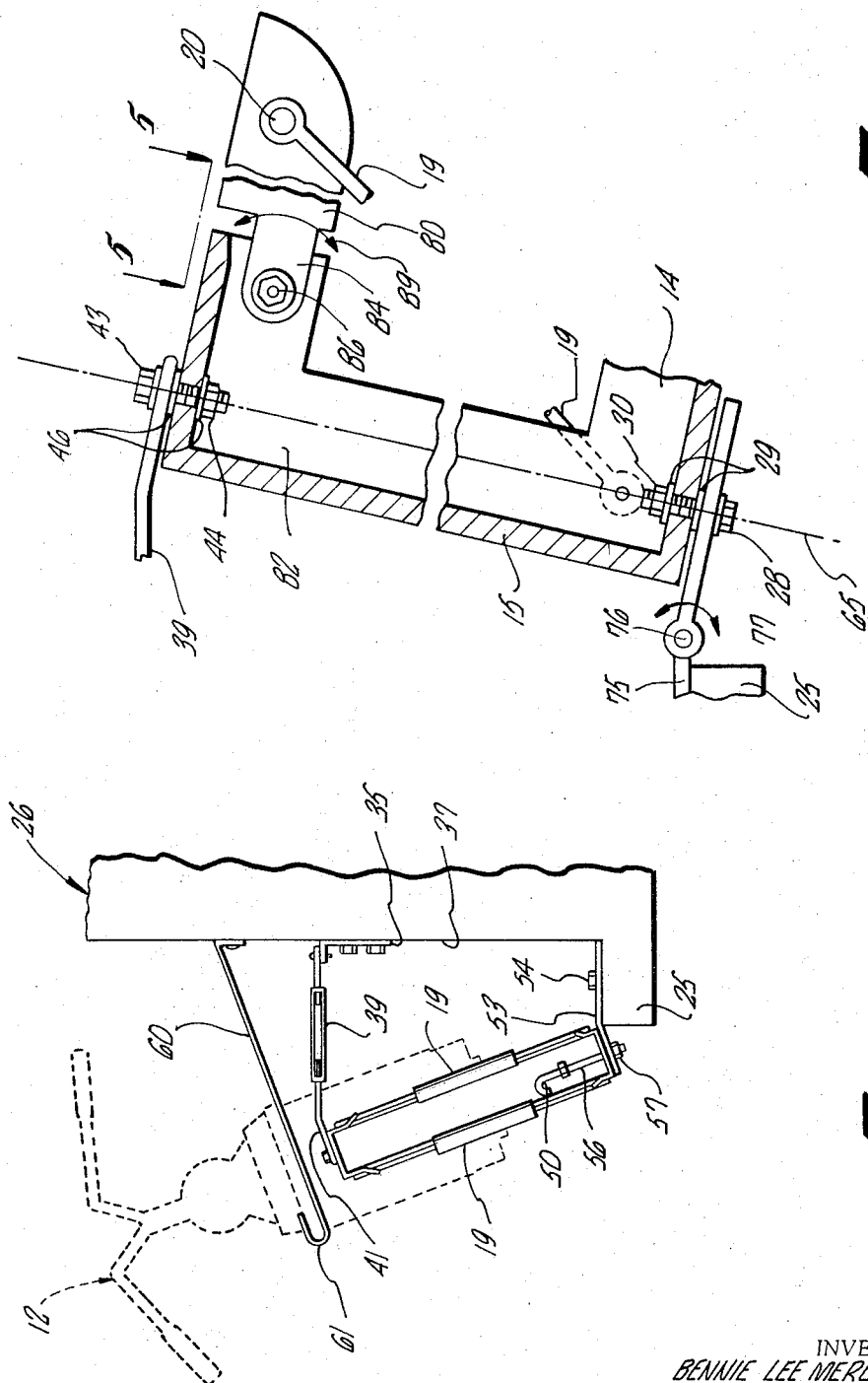
INVENTORS.
BENNIE LEE MEREDITH
BENNIE LEE MEREDITH, JR.
BY
Christie, Parker & Hale
ATTORNEYS.

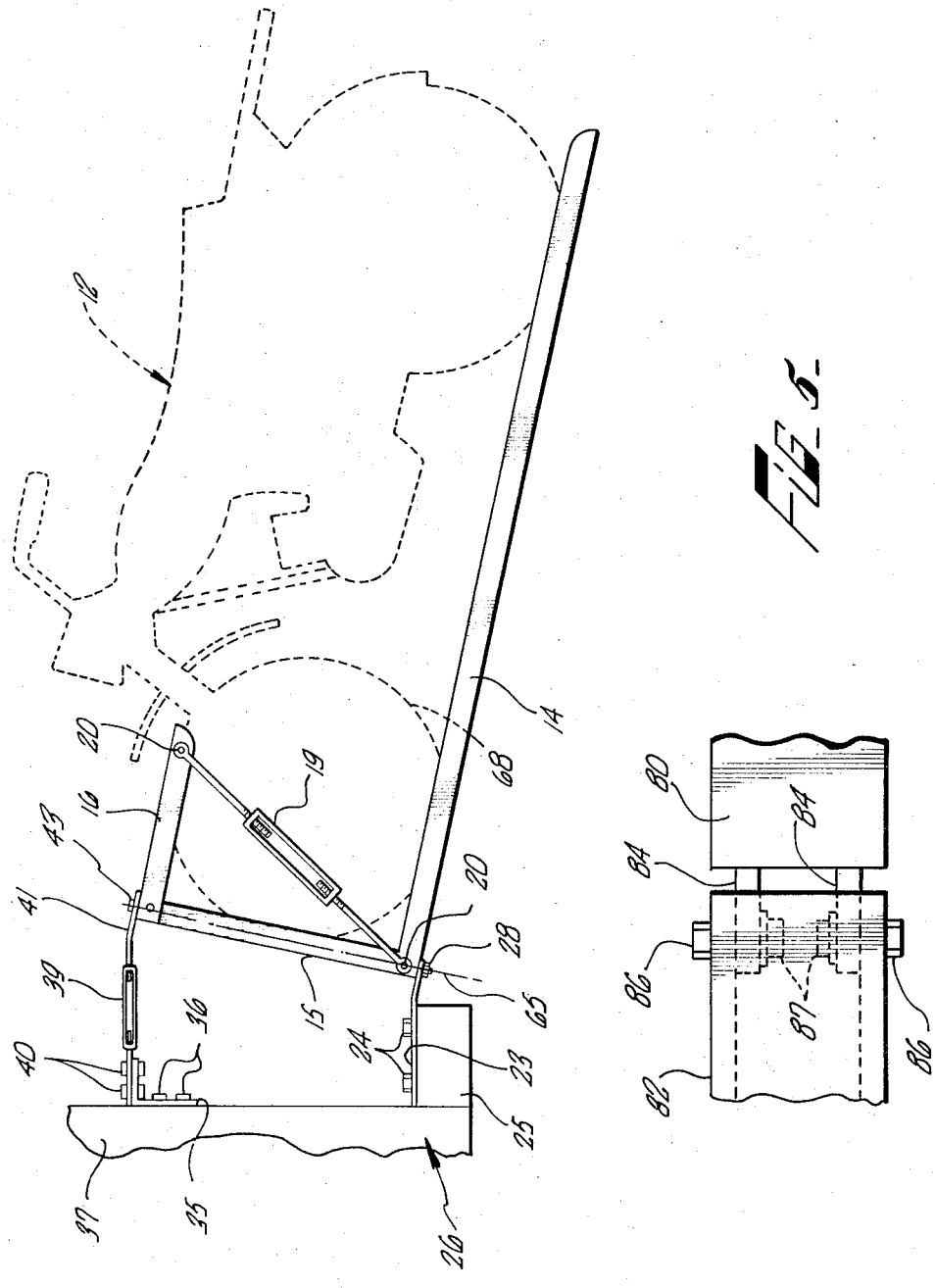

United States Patent Office 3,366,256
Patented Jan. 30, 1968

3,366,256
MOTORCYCLE RACK
Bennie Lee Meredith, 5653 Raber St., and Bennie Lee
Meredith, Jr., 541 Terrill Ave., both of Los Angeles,
Calif. 90042
Filed July 13, 1966, Ser. No. 564,904
5 Claims. (Cl. 214—450)

ABSTRACT OF THE DISCLOSURE

A motorcycle rack secured to a motor vehicle by a hinge having a pivot axis which is inclined upwardly away from the vehicle so the rack can be swung from a transit position against the vehicle to a loading position in which the rack slopes downwardly away from the vehicle into contact with the ground.

This application relates to an improved rack for carrying a motorcycle on a road vehicle such as an automobile, camper or trailer.

Lightweight motorcycles, popularly known as "trail bikes," have been increasingly popular in recent years as a general means of transportation, and especially to carry hunters, fishermen and campers into remote areas which are inaccessible by car or truck. These motorcycles are sufficiently compact that they may be secured to the outside of an automobile or camper vehicle and carried in a stowed position along the highway. When a stopping point is reached, the motorcycle is unloaded from the road vehicle and can be used for transportation into back country which is inaccessible to larger vehicles.

A variety of racks have been designed to mount a motorcycle on a road vehicle. Most of these known racks include a series of clamps and brackets secured to the vehicle, and the motorcycle is suspended on these fixtures. Most of these mounts are designed to carry the motorcycle at the rear end of the vehicle, with the motorcycle positioned above the vehicle rear bumper. The motorcycle therefore must be manually lifted several feet off the ground in order to place it on the rack.

While the trail-bike style of motorcycle is more compact and considerably lighter than a conventional motorcycle, most models are still too heavy to be lifted conveniently by one person. The average person has thus found it necessary to obtain assistance during the motorcycle-loading operation, or to use a winch apparatus to assist in lifting the motorcycle into position on the rack. There are often situations where the user is unable to secure assistance during the loading operation, and racks which incorporate winches are relatively expensive and complex. Known racks have therefore been somewhat unsatisfactory, and a definite need exists for a simple, inexpensive rack on which a motorcycle can be loaded by one person without fear of back strain or other injury.

The motorcycle rack of this invention overcomes the deficiencies in known racks, is readily mounted on many different styles of road vehicles, and is easily adapted for use with various types of motorcycles. Our rack includes a frame which is pivotally mounted to the vehicle whereby one end of the rack can be swung downwardly away from the vehicle into contact with the ground. The motorcycle is then driven on to the frame either under power or manually, and the front wheel of the motorcycle is secured in the frame. The frame and motorcycle are then pushed laterally back toward the vehicle, and part of this lateral motion is translated by our hinge design into a vertical lifting motion which elevates the motorcycle easily into a stowed position against the vehicle. The need for direct lifting of the motorcycle is thus completely eliminated, and one person can readily position the motorcycle in a stowed position without undue exertion or risk of back strain.

Briefly stated, the motorcycle rack of this invention includes a frame adapted to receive the motorcycle, and hinge means secured to one end of the frame and adapted to be secured to the vehicle. The hinge means has a pivot axis which is inclined upwardly away from the vehicle whereby the frame can be swung from a transit position against the vehicle into an unloading position in which the frame slopes downwardly toward the ground and away from the vehicle.

Preferably, the motorcycle rack includes lock means adapted to be secured to the vehicle and engageable with the frame for locking the frame in a loaded or stowed position. The frame which supports the motorcycle is preferably adapted to receive and grip the motorcycle front wheel to provide secure support during the loading operation. In one form, the rack is adjustable to receive front wheels of various diameters, and also has an adjustable slope in the unloading position to compensate for uneven terrain when the road vehicle is parked in a rough area.

The invention will be described in detail with reference to the attached drawings, in which:

FIG. 1 is a rear elevation of a camper truck on which is mounted a motorcycle rack according to the invention and a motorcycle (shown in phantom) in stowed position:

FIG. 2 is a view along lines 2—2 of FIG. 1;

FIG. 3 is a side elevation of the motorcycle rack in an unloading position;

FIG. 4 is an enlarged side elevation, partly broken away and in cross section, of a portion of the motorcycle-rack frame; and FIG. 5 is a view along lines 5—5 of FIG. 4.

Referring to FIGS. 1–3, a motorcycle rack 10 according to the invention includes a frame 11 adapted to receive and support a motorcycle 12 (shown in phantom). The frame is formed from steel channel material, the channel being generally U-shaped as seen in FIG. 2, and includes an elongated base member 14, an end member 15 secured to and extending generally perpendicularly upward from an end of the base member, and a clamp member 16 secured to the top of the end member and extending generally parallel to and back over the base member. A pair of extensible means such as turnbuckles 19 are secured by bolts 20 on opposite sides of the frame to extend diagonally between the free end of the clamp member and the bottom of the end member. The frame is sufficiently resilient that the spacing between the clamp member and the base member may be adjusted by varying the length of turnbuckles 19. As shown in FIG. 2, the free ends of clamp and base members have outwardly flared sides to guide the motorcycle wheels into the channels of the frame during the loading operation.

A lower bracket 23 is secured by bolts 24 to a rear bumper 25 of a road vehicle 26 on which the motorcycle is to be mounted. The lower bracket extends rearwardly beyond the bumper (see FIG. 3), and the portion of the bracket which overhangs the bumper slopes downwardly toward the ground. As shown in detail in an alternative form of the invention in FIG. 4, the frame and lower bracket are pivotally secured together by a bolt 28 which passes through clearance holes in the end of the lower bracket and through the bottom of base member 14. A pair of washers 29 are installed over the bolt on opposite sides of base member 14 to insure that the frame can pivot freely about the bracket, and the bolt is secured in place by a nut 30.

An upper bracket member 35 is secured by a pair of bolts 36 to a rear upright frame 37 of vehicle 26, and is spaced from and positioned vertically above lower bracket 23. One end of a turnbuckle 39 is rigidly secured by a pair of bolts 40 to the upper bracket. A second end 41 of the turnbuckle slopes downwardly and extends rearwardly away from rear frame 37 of the vehicle. The second end of the turnbuckle is pivotally secured to the top of the frame adjacent end member 15 by a bolt 43 (see FIG. 4) which extends through clearance holes in second end 41 and the frame to be secured in place by a nut 44. A pair of washers 46 are positioned over the bolt on opposite sides of the frame to insure that the frame will pivot freely about the bolt and second end 41 of the rigidly mounted turnbuckle. Turnbuckle 39 is longer than lower bracket 23 such that second end 41 of the turnbuckle extends rearwardly beyond a vertical axis through the pivotal connection of the lower bracket and frame.

A J-shaped tie-down bolt 50 extends through a clearance hole (not shown) midway along the length of base member 14, and is secured in place by a nut 51 after the hooked end of the bolt has been positioned over a frame member of the motorcycle. A lock bracket 53 is secured by a bolt 54 to the right end (as viewed in FIG. 1) of bumper 25, and the end of the bracket overhangs the bumper and slopes downwardly toward the ground. The lock bracket is positioned to place this overhanging portion immediately under the end of base member 14 when the frame is placed in a stowed position.

The base member and lock bracket are secured together in the stowed position by a lock bolt 56 and nut 57. As shown in FIG. 1, the upper part of bolt 56 is bent slightly to snugly engage the motorcycle rear wheel and serve as a stop to prevent the motorcycle from moving out of the rack in the event of loss of tie-down bolt 50.

A brace member 60 is secured to rear frame 37 of the vehicle above the lock bracket, and has a hooked end 61 positioned to engage and clamp a luggage-carrier rack on the motorcycle. Brace member 60 is relatively flexible so it can be bent downwardly for clearance as the motorcycle is moved into a stowed position.

To load motorcycle 12 on to the rack, lock bolt 56 is removed and frame 11 is hinged rearwardly and downwardly about bolts 28 and 43 into the position shown in FIG. 3. As upper bolt 43 is spaced rearwardly beyond lower bolt 28, the frame hinges about an inclined pivot axis 65 passing longitudinally through the bolts. The free end of the frame therefore moves both outwardly and downwardly with respect to the vehicle as it is swung around the inclined pivot axis. The degree of inclination of the pivot axis can be adjusted by lengthening or shortening turnbuckle 39 whereby the free end of base member 14 can be moved vertically until it contacts the ground in back of the vehicle.

With the frame thus positioned in a loading and unloading position as shown in FIG. 3, motorcycle 12 is steered into channel-shaped base member 14 and is then driven up the sloping base member under power. Alternatively, the motorcycle can be pushed up the inclined base by hand, but this maneuver is easily accomplished under power with less exertion.

As a front wheel 68 of the motorcycle approaches the end of the base, the top of the front wheel passes into channel-shaped clamp member 16, and the front of the wheel abuts end member 15. The length of turnbuckle 19 is adjusted to space base member 14 and clamp member 16 such that the front wheel of the motorcycle must be forced between these members. The front wheel is thus resiliently clamped in the frame, and the rider can dismount and complete the additional steps of the stowing operation without fear of the motorcycle rolling back down the base member out of the frame.

Tie-down bolt 50 is then hooked over a lower frame member 70 of the motorcycle, and the tie-down bolt is secured tightly in place by nut 51 to clamp the motorcycle firmly in the rack. The rack is then swung back against the rear frame of the vehicle into the position shown in FIGS. 1 and 2. As already explained, inclined pivot axis 65 causes a horizontal pushing force on the motorcycle and frame to both rotate and lift the motorcycle and frame into position against the vehicle. Lock bolt 56 is then inserted through the base member and lock bracket, and secured in place with nut 57, with the head of the lock bolt positioned against a rear tire 72 of the motorcycle to serve as an emergency stop in case tie-down bolt 50 should loosen. Unloading of the motorcycle from the rack is of course accomplished by reversing the steps just described.

An alternative form of the motorcycle rack is shown in FIGS. 4 and 5, and is useful where substantial variation in motorcycle front-wheel diameter is anticipated, and also where substantial variations in terrain level are expected. Terrain-level variations are compensated by a hinged lower bracket 75 which is secured to bumper 25 and base member 14 in the same manner as lower bracket 23 described above. Bracket 75 includes a hinge 76 which permits the rearwardly extending end of the bracket to pivot freely as indicated by arrows 77 in FIG. 4. Large variations in the length of turnbuckle 39 can thus be made without inducing high stress in the lower bracket, as the frame pivots freely about the hinged lower bracket.

To adapt the motorcycle rack to accept front wheels of widely varying diameters, the frame is modified as shown in FIGS. 4 and 5 to include a hinged clamp member 80 which is pivotally secured to a horizontal extension of a modified end member 82. Clamp member 80 has a pair of outwardly extending tabs 84, and the tabs are pivotally secured to end member 82 by a pair of bolts 86 and nuts 87. The clamp member is thus free to hinge about the end member as indicated by arrows 89 in response to length adjustments of turnbuckle 19, and large variations in motorcycle front-wheel diameter are thereby readily accommodated.

There has been described a motorcycle rack which is characterized by great ease of loading and unloading as well as simplicity and low cost. The principles embodied in our design can be employed in various other forms of motorcycle racks, and it is intended that all such forms fall within the scope of the following claims.

What is claimed is:

1. A motorcycle rack for carrying a motor cycle on a road vehicle, the rack comprising:

a frame adapted to receive and hold the motorcycle in clamping engagement, said frame including a channel-shaped base member, an end member secured to and extending upwardly from the base member, and a channel-shaped clamp member secured to and extending laterally from the end member over the base member;

hinge means secured to one end of the frame and adapted to be secured to the vehicle, the hinge means having a pivot axis which is inclined upwardly away from the vehicle whereby the frame can be swung from a stowed position against the vehicle into an unloading position in which the frame slopes downwardly toward the ground and away from the vehicle; and lock means adapted to be secured to the vehicle and engageable with the frame for locking the frame in the stowed position.

2. The motorcycle rack defined in claim 1 and further comprising extensible means secured to the frame for adjusting the spacing of the clamp member and base member whereby motorcycle wheels of varying diameters can be clamped between the clamp and base members.

3. The motorcycle rack defined in claim 1, in which the hinge means includes an upper bracket pivotally secured to the frame adjacent the upper end of the end member, and a lower bracket pivotally secured to the frame adjacent the lower end of the end member, the upper bracket being longer than the lower bracket.

4. The motorcycle rack defined in claim 1, and further comprising a tie-down bolt releasably secured to the lower member for clamping the motorcycle in the frame.

5. In combination with a road vehicle and with a motorcycle having front and rear wheels, an improved motorcycle rack comprising:

a frame having a channel-shaped base member, an end member secured to and extending upwardly from the base member, and a channel-shaped clamp member secured to and extending laterally from the end member over the base member, the motorcycle being positioned in the frame with the front and rear wheels resting on the base member and the front wheel clamped between the base member and clamp member;

hinge means secured to the vehicle and to the frame, the hinge means having a pivot axis which is inclined upwardly away from the vehicle whereby the frame can be swung from a stowed position against the vehicle and above the ground into an unloading position in which the frame slopes downwardly toward the ground and away from the vehicle; and lock means secured to the vehicle and engageable with the frame for locking the frame in the stowed position.

References Cited

UNITED STATES PATENTS

| 3,048,284 | 8/1962 | Cissna et al. | 214—77 |
| 3,176,903 | 4/1965 | Farley | 224—42.03 |
| 3,207,396 | 9/1965 | Mundell et al. | 224—42.03 |
| 3,251,520 | 5/1966 | Van Dyke et al. | 224—42.03 |

FOREIGN PATENTS 749,561  5/1933  France.

GERALD M. FORLENZA, *Primary Examiner.*

R. J. SPAR, *Examiner.*